United States Patent
Kawamura et al.

[11] 3,838,896
[45] Oct. 1, 1974

[54] DUST SEAL FOR ENDLESS TRACKS OF A TRACTOR

[75] Inventors: Toshio Kawamura, Hiratsuka; Kazuo Taguchi, Urawa; Nobuyuki Kanayama, Hiratsuka, all of Japan

[73] Assignee: Kabushiki Kaisha Komatsu Seisakusho, Tokyo, Japan

[22] Filed: June 30, 1972

[21] Appl. No.: 268,141

[30] Foreign Application Priority Data
July 19, 1971   Japan.............................. 46-626874

[52] U.S. Cl. ................................................. 305/11
[51] Int. Cl. ............................................ B62d 55/20
[58] Field of Search.......................... 305/11, 58, 14

[56] References Cited
UNITED STATES PATENTS

| | | |
|---|---|---|
| 2,699,974 | 1/1955 | Deffenbaugh........................ 305/11 |
| 3,218,107 | 11/1965 | Reinsma ............................... 305/11 |
| 3,235,315 | 2/1966 | Schnacke.............................. 305/11 |
| 3,347,602 | 10/1967 | Rixmann............................... 305/11 |
| 3,392,984 | 7/1968 | Reinsma ............................... 305/11 |
| 3,560,059 | 2/1971 | Miyake.................................. 305/11 |

*Primary Examiner*—David Schonberg
*Attorney, Agent, or Firm*—Armstrong, Nikaido & Wegner

[57] ABSTRACT

Dust seal for endless tracks of a tractor having a pin, a pair of links engaged with both ends of the pin, and a bushing engaged between the other link and the pin, which has means for supporting a thrust load applied to the links, and a resilient seal member engaged with the pin between one link and the bushing inside the supporting means.

2 Claims, 9 Drawing Figures

DUST SEAL FOR ENDLESS TRACKS OF A TRACTOR

BACKGROUND OF THE INVENTION

This invention relates to the tracks of a tractor, and more particularly to improvements in a dust seal for the tracks of such a tractor.

In the conventional tracks of a construction vehicle such as a crawler tractor, plural links are connected to each other by a pin, to which sealing means are provided for preventing earth and sand from entering into the shaft. One example of the conventional tracks is so constructed that a dust seal of a foam resilient member and a wear resisting resilient member connected together and engaged with a pin is provided in the link spaces formed by adjacent links, a shaft for engaging the links, and a bushing engaged with the pin. Another example of conventional tracks is so constructed that a dust seal in the form of metal leaf springs is provided in a manner such that both the backs of the springs are faced to each other in the link spaces, and a further example of the conventional tracks is so constructed that a dust seal in the form of an O-ring and two metal rings superimposed on one another is provided in the link spaces so as to prevent the earth and sand or muddy water from entering between the shaft and the bushing. However, when a thrust load is applied to the dust seal of any one of the above conventional examples, the deformation of the resilient member is great with the result of early fatigue of the resilient member, and therefore, it may be anticipated that early failure of the dust seal will occur. And, the dust seal using the foam material as the resilient member tends to absorb muddy water so that when the resilient member is contracted, it discharges the absorbed muddy water with the result that sealing performance is improper. In the dust seal using metal leaf springs, the water tightness of the dust seal is improper so that muddy water is not prevented from entering through the dust seal.

SUMMARY OF THE PRESENT INVENTION

This invention contemplates the elimination of the aforementioned disadvantages of the conventional dust seal of the tracks of a tractor and to provide a novel and improved dust seal for such tracks.

It is an object of the present invention to provide a dust seal for the tracks of a tractor which bears the thrust load produced at the links by thrust supporting means so as to prevent the fatigue and failure of the seal ring.

It is another object of the present invention to provide a dust seal for the tracks of a tractor which smooths the rocking of the shaft and the bushing.

It is a further object of the present invention to provide a dust seal with excellent wear resistance and long life for the tracks of a tractor.

It is still another object of the present invention to provide a dust seal for the tracks of a tractor which has sufficient sealing ability for preventing the earth and sand or muddy water from entering between the pin and the bushing.

According to one aspect of the present invention, there is provided a dust seal for the tracks of a tractor and having a pin, a pair of links engaged with both ends of the pin, and a bushing engaged between the one link and the pin, which comprises a means for supporting a thrust load applied to the links, and a resilient seal member engaged with the pin between one link and the bushing inside the supporting means.

One characteristic feature of the dust seal of the present invention is such that the thrust supporting means is formed at the end of the bushing contacting with one facing link, and a resilient seal ring is inserted into the space formed by the thrust supporting means of the bushing and the pin with the link. Thus, even if the tracks are rocked longitudinally so that a thrust load is applied to the links, it is smoothed through the contact of the thrust supporting means with the, with the result that the thrust load does not so strongly act upon the seal ring thus reducing the seal ring fatigue. The rocking between the pin and the bushing is also smoothed by the resiliency of the seal ring.

Another characteristic feature of the dust seal of the present invention is such that a rubber seal member previously immersed in lubricating oil is inserted under pressure in the link space formed by the pin and the bushing with the link, and a metal collar surrounds the seal member. Thus, the thrust load applied to the seal member is supported and absorbed by the seal member and the metal collar so that the seal member is not broken. Since the seal member is inserted under pressure and has high resilience, and since it is oil-lubricated, it is slidable with respect to the pin. Therefore, it has proper wear resistance and superior water tightness so as to prevent earth and sand or muddy water from entering.

A further characteristic feature of the dust seal of the present invention is such that a recess is formed at the end of the bushing and a collar is inserted into the recess at one end and is contacted with one link at the other end in the link recess, and a resilient ring is inserted surrounding the pin under pressure inside the collar. Thus, since the thrust load applied to the links is supported by the collar and the resilient ring, and the rotating motion between the shaft and the bushing is made possible partly by the deformation of the resilient ring and partly by slippage between the shaft and the ring as well as between the ring and the collar, the ring is not damaged by the thrust load, and the dust seal will positively prevent earth and sand from entering through the dust seal.

These and other objects, features and advantages of the present invention will become more apparent from the following description taken in conjunction with the accompanying drawings.

DETAILED DESCRIPTION OF THE PREFERRED EMBODIMENTS

Figure 1:
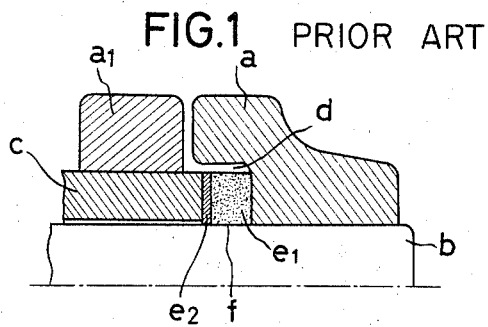
FIGS. 1 to 3 are sectional views of the conventional dust seal for tracks of a tractor.

For better understanding of the dust seal of the present invention, the conventional dust seals will now be described with reference to FIGS. 1 to 3, which show conventional examples of such dust seals.

In the conventional tracks of a tractor, plural links are connected to each other by the respective shafts $b$, to which sealing means are provided for preventing earth and sand from entering between the shafts $b$ and the bush $c$. In FIG. 1, which shows one example of the conventional dust seal of the tracks of the tractor, a dust seal member $f$ of a foamed resilient member $e1$ and a wear resisting resilient member $e2$ are connected together and engaged with the pin $b$ and provided in the space $d$ of links $a$ formed by adjacent links $a$ and $a1$, the shaft $b$ for engaging the links, and in bushing $c$ engaged with the pin $b$.

Figure 2:
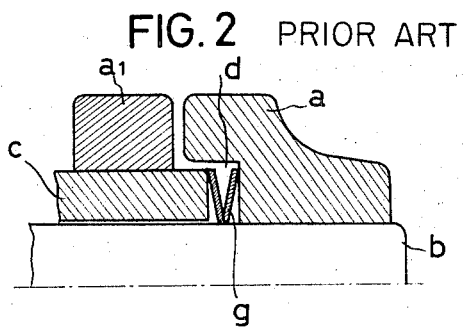

In FIG. 2, which shows another example of the conventional dust seal, a dust seal in the form of metal leaf springs $g$ is provided in a manner such that both the backs of the springs $g$ are faced to each other in the space $d$ between the links $a$ and $a1$.

Figure 3:
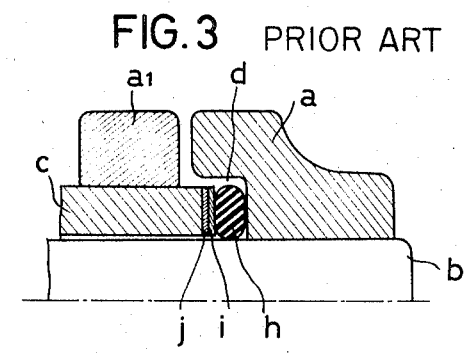

In FIG. 3, which shows a further example of the conventional dust seal, a dust seal is formed of O-ring $h$, and two metal rings $i$ and $j$ superimposed over each other and is provided in the space $d$ between the links $a$ and $a$ so as to prevent earth and sand or muddy water from entering between the shaft $b$ and the bushing $c$. However, if a thrust load is applied to the above seal member $f$, deformation of the resilient member occurs and the member is fatigued early, and therefore, it is anticipated that the dust seal will require replacement earlier. Also, the dust seal using the foamed material as the resilient member tends to absorb muddy water so that when the resilient member is compressed, it exudes the absorbed muddy water with the result that the sealing performance is insufficient. The water tightness of the dust seal using metal leaf springs is also insufficient so that muddy water is not prevented from entering through the dust seal.

Figure 4:
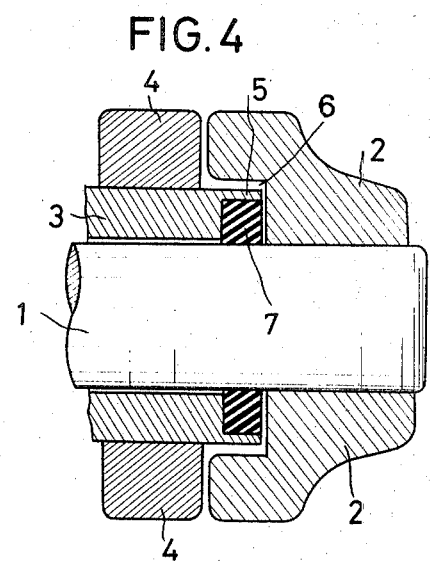
FIG. 4 is a sectional view of the essential part of one embodiment of the dust seal constructed according to the present invention.
Figures 5, 6:
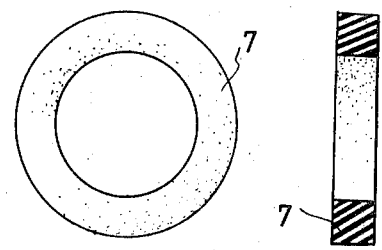
FIG. 5 is a plan view of a seal ring used in the dust seal of the present invention.
FIG. 6 is a sectional view of the seal ring shown in FIG. 5.

Reference is now made to FIGS. 4 to 6, which show the essential parts of one embodiment of the dust seal of the present invention.

Reference numeral 1 illustrates a pin, and one link 2 of a track (not shown) is engaged with the both ends of the pin 1. A bushing 3 is engaged around the pin 1, and the other link 4 of the track (not shown) is engaged with the bushing 3. A cylindrical thrust supporting means 5 is formed around the outer peripheral edges of both end surfaces of the bushing 3, and a recess 6 for inserting a seal ring 7 under pressure is formed by the thrust supporting means 5 and the pin 1 with one line 2.

Referring now to FIGS. 5 and 6, which show the seal ring used in the dust seal of this invention, the seal ring 7 is made of a resilient wear resistant material and is inserted into the recess 6 under pressure.

When the tracks rock longitudinally along the pin 1 in a right and left direction in the drawing so that a thrust load is applied to the links 2 and 4, the end surface of the thrust supporting means 5 contacts with the inner surface of the link 2 in a collision, with the result that it receives the thrust load, and accordingly no extreme thrust load is applied to the seal ring 7 itself. Since the seal ring 7 is twisted when the bushing 3 rocks with respect to the pin 1, this twisting of the seal ring 7 smooths the rocking of the pin 1 and the bushing 3.

Figure 7:
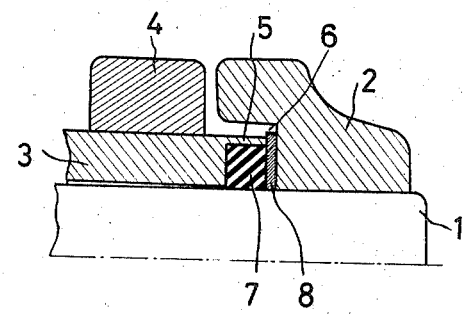
FIG. 7 is a sectional view of another embodiment of the dust seal of the present invention.

Reference is now made to FIG. 7, which shows another embodiment of the dust seal constructed in accordance with the present invention.

A synthetic resin washer 8 of good wear resistance is provided in contact with the inner surface of the link 2 so as to smooths the thrust load contacted in a collision with the thrust supporting means 5 and to improve the endurability of the dust seal.

Figure 8:
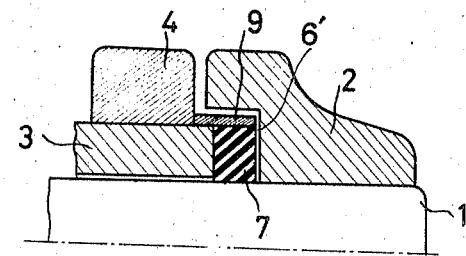
FIG. 8 is a sectional view of a further embodiment of the dust seal constructed in accordance with the present invention.

Referring now to FIG. 8, which shows a further embodiment of the dust seal of the present invention, a recess 6' is formed at the link 2 around the pin 1 at the link 4 side, and the opening of the recess 6' is substantially closed by the end of the bushing 3 inserted into the pin 1 so as to form a space 6'. A seal member or ring 7 is inserted into the space 6' by being compressed in radial direction. The seal member 7 is made of rubber previously immersed in lubricating oil such as, for example, hard urethane rubber, nitril rubber, chloroprene rubber, etc. previously swelled in engine oil. A metal collar 9 is inserted under pressure around the seal member 7 at the end of the bushing 3 contacting at one end with the inner surface of the recess 6' of the link 2 and at the other end with the link 4.

In operation, even if a thrust load is applied to the seal member 7, since the thrust load is supported by the seal member 7 and the metal ring 8, there is no apprehension that excessive thrust load is applied to the seal member 7 so as to damage it, and since the seal member is inserted under pressure into the space, it is compressed and is oil-lubricated, and therefore, it has good wear resistance and superior water tightness so as to prevent earth and sand or muddy water from entering between the bushing and the pin.

Figure 9:
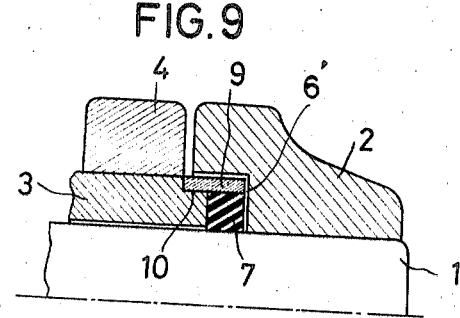
FIG. 9 is a sectional view of still another embodiment of the dust seal of this invention.

Reference is now made to FIG. 9, which shows still another embodiment of the dust seal of this invention. One end of the bushing 3 is projected into the recess 6' of the link 2 in reduced diameter so as to form a stepped recess 10. A cylindrical collar 9 is engaged in contact with the stepped recess 10. The metal collar 9 is made of hardened steel. The metal collar 9 is so projected into the space 6' and so formed as to surround the pin 1 and to contact with the bottom of the space 6' of the link 2 so as to bear the thrust load applied to the pin 1. A seal ring 7 is so inserted into the metal collar 9 around the pin 1 compressed in the radial direction in such a manner that the exposed end surface of the seal ring 7 is disposed substantially even the end of the metal collar 9.

It should be understood from the foregoing description that since the dust seal of the invention comprises a metal collar 9 inserted in contact into the stepped recess 10 formed at the end of the bushing 3 and contacted with the bottom surface of the space 6' of the link 2 at the other end, and a resilient seal ring 7 inserted inside the metal collar 9 around the shaft 1 under pressure, the thrust load applied to the links is supported by the collar and the resilient ring, and the rotating motion between the shaft and the bushing is made possible partly by the deformation of the resilient ring and partly by slipping between the shaft and the ring as well as between the ring and the collar so that the ring 7 is not damaged by the thrust load and the dust seal may positively prevent earth and sand or muddy water from entering between the bushing and the pin.

We claim:

1. A dust seal for the endless tracks of a tractor having a pin, a pair of links engaged with both ends of the pin and at least one link having a recess formed inside thereof around the pin, a bushing engaged around the pin, and at least one link engaged with the bushing, comprising a cylindrical thrust supporting means disposed in the said recess for supporting a thrust load applied to the links and the pin, and a resilient seal ring of resilient wear resistant material inserted into that portion of the recess of said link located between the cylindrical thrust supporting means and the pin under pressure in such a manner that the exposed end surface thereof is disposed substantially at the end of said thrust supporting means wherein said thrust supporting means is a cylindrical extension of said bushing, and wherein said cylindrical thrust supporting means is a metal collar inserted under pressure around the outer periphery of the bushing and the resilient seal ring at the end of said bushing contacting at one end with the inner surface of the recess formed at one end of one link and at the other end with the other link.

2. A dust seal for the endless tracks of a tractor having a pin, a pair of links engaged with both ends of the pin and, at least, one link having a recess formed inside thereof around the pin, a bushing engaged around the pin, and, at least, one link engaged with the bushing, comprising a cylindrical thrust supporting means disposed in the said recess for supporting a thrust load applied to the links and the pin, and a resilient seal ring of resilient wear resistant material inserted into that portion of the recess of said link located between the cylindrical thrust supporting means and the pin under pressure in such a manner that the exposed end surface thereof is disposed substantially at the end of said thrust supporting means, wherein said cylindrical thrust supporting means is a cylindrical metal collar of hardened steel engaged in contact with a stepped recess formed at the end of said bushing at one end and with the resilient seal ring at the other end.

* * * * *